United States Patent [19]

Feiger

[11] 4,274,077
[45] Jun. 16, 1981

[54] VEHICLE COVER AND ALARM SYSTEM THEREFOR

[76] Inventor: Jerrold C. Feiger, 11820 Mayfield Ave., Los Angeles, Calif. 90049

[21] Appl. No.: 97,344

[22] Filed: Nov. 26, 1979

[51] Int. Cl.$^3$ ............................................. B60R 25/10
[52] U.S. Cl. ..................................... 340/63; 340/568; 340/571; 340/689
[58] Field of Search .................... 340/63, 65, 507, 539, 340/547, 550, 568, 571, 686, 687, 689

[56] References Cited

U.S. PATENT DOCUMENTS

| | | | |
|---|---|---|---|
| 3,159,165 | 12/1964 | Cohen et al. ........................ | 340/689 |
| 3,253,270 | 5/1966 | Downer ............................... | 340/568 |
| 3,971,006 | 7/1976 | Pressly, Jr. .......................... | 340/689 |

*Primary Examiner*—Alvin H. Waring
*Attorney, Agent, or Firm*—Cislo & O'Reilly

[57] ABSTRACT

A vehicle protective cover and alarm system therefor wherein the cover is of a design and configuration to at least enshroud the major body portion of the vehicle, and wherein at least two sensors are placed in opposed relationship to each of the inside surfaces of the cover and being coupled to an electrical system which upon movement of the cover will energize the system to produce an alarm signal.

11 Claims, 5 Drawing Figures

VEHICLE COVER AND ALARM SYSTEM THEREFOR

BACKGROUND OF THE INVENTION

The high incidence of automobile theft, tampering and stripping of parts from automobiles and theft of covers has become a well-known problem in recent years requiring owners of certain types of automobiles to take drastic measures to protect their property. Automobile alarm systems are now available that sound an audible or inaudible alarm whenever an automobile is tampered with as by means of unauthorized attempted entry to the vehicle, unauthorized manipulation of the ignition system or in some cases, even abnormal movement of the automobile itself.

In many instances, especially in climes in proximity to salt water oceans, or geographical areas where there is an abundance of sunshine, it becomes desirable to be able to protect the finish of an automobile as by way of an automobile cover. These covers must, by their very use, be capable of being easily positioned on an automobile and easily taken off so as to make their use practical and beneficial to the owner thereof. In many of the prior art alarm systems, there is no provision to protect an automobile's wheels or hubcaps from being removed or otherwise tampered with, nor as far as is known, is there any provision in the prior art to prevent automobile covers from themselves being the subject of theft. With the herein disclosed invention, it is now possible to protect an automobile's finish, hubcaps and wheels and cover itself from tampering and/or attempted theft.

With the provision of sensors which are held on the interior panels of a cover, for example, and connected to electrical connecting systems which energize an alarm upon movement of the cover, and therefore the sensor itself, a means is obtained whereby the hubcaps, wheels and cover of the vehicle are protected against tampering and theft to the extent that any unauthorized movement will set off an audible alarm or produce a transmittable inaudible signal.

It is an object of the invention to provide an alarmed cover for vehicles and the like.

It is another object of the invention to provide an automobile cover or the like for use on automobiles wherein use thereof protects against tampering and/or theft of hubcaps and/or wheels of the vehicle and the theft of the cover by means of sounding an alarm signal when unauthorized acts are taking place.

It is still another more specific important object of the invention to provide an automobile cover which is easily adapted for utilization with the electrical system of an automobile, or alternately, for modular association into an existing automobile alarm system.

It is another even more specific, further object of the invention to provide an automobile cover which is provided with sensors, which upon unauthorized movement of the cover and sensors will produce an alarm signal.

It is still another even more specific and further object of the invention to provide a vehicle cover for automobiles and the like wherein the side panels of the cover are of such length to at least partially cover the hubcaps and/or wheels of the vehicle, and wherein movement thereof will set off an alarm signal to indicate unauthorized tampering therewith.

It is another even more further, and even more specific object of the invention to provide a vehicle cover for automobiles and the like made of washable fabric wherein sensors and electrical connectors are releasably secured to the interior of said cover, and wherein said sensors and electrical connectors are adapted for association with an alarm system whereby unauthorized movement of the cover and secured sensors will create an alarm signal.

Generally, in an exemplary embodiment, the invention pertains to an anti-tamper device for vehicles and the like comprising the combination of a cover having side panels adapted to enshroud at least the major body portion of a vehicle. At least one sensor is secured to each of the side panels and is adapted to energize and de-energize an electrical circuit upon movement of the sensor and associated cover. Electrical connector means connects the sensors with an alarm system adapted to produce an alarm signal whereby in the normal undisturbed covered state, said sensors are in the non-energizing position and otherwise are in the energizing position to energize the alarm system to sound an audible alarm signal or transmit an inaudible signal to a beeper or the like.

These and other objects of the invention will become apparent as the description proceeds herein taken in conjunction with the drawings.

DESCRIPTION OF THE BEST EMBODIMENTS CONTEMPLATED

Figure 1:
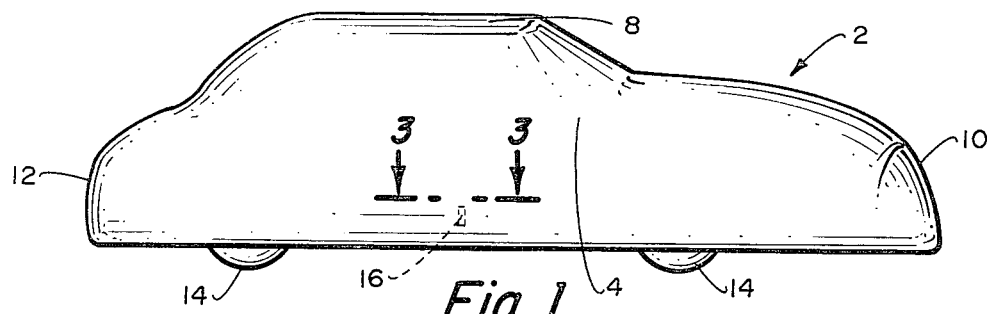
FIG. 1 is a side elevational view of the cover of the invention.
Figure 2:
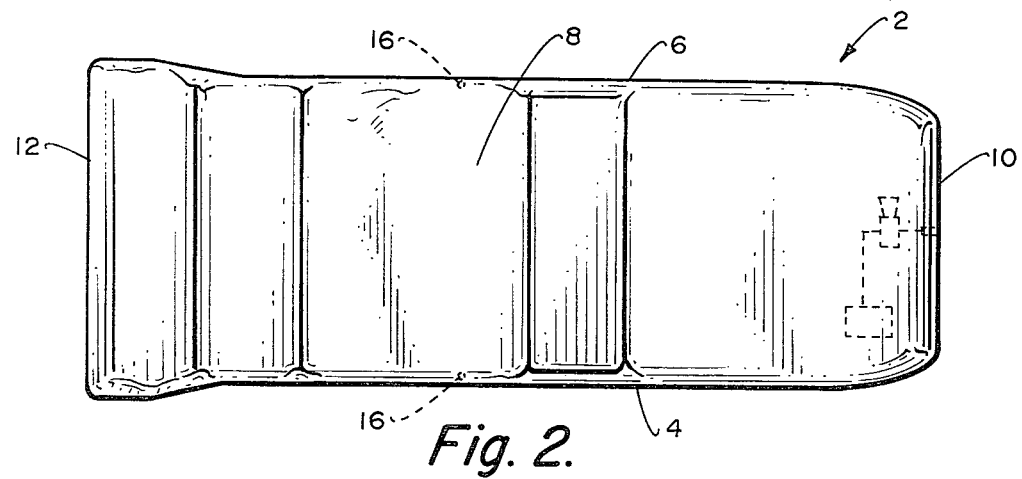
FIG. 2 is a top view of the cover of the invention illustrating in phantom line a typical, intrinsic alarm system available for use with the cover of the invention.
Figure 4:
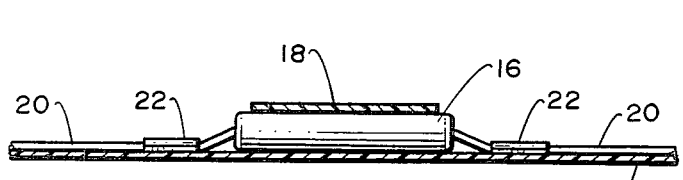
FIG. 4 is a view taken along the line 4—4 of FIG. 3.
Figure 3:
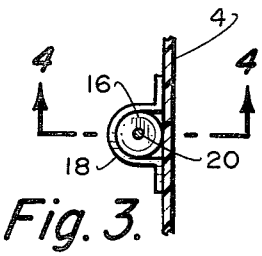
FIG. 3 is a view taken along the line 3—3 of FIG. 1.

Referring to the drawings wherein like numerals of reference designate like elements throughout, it would be noted that the vehicle or automobile cover 2 may be of the ubiquitous type normally encountered in sunbelt areas such as Southern California and Florida, especially along coastal stretches where salt air is likely to be encountered.

The cover 2 has side panels 4 and 6 and top 8 with ends 10 and 12, and may be of any configuration dependent upon the automobile to be enshrouded but having sidewalls or panels 4 and 6 of a sufficient length to at least partially overlie hubcaps (not shown) and wheels 14 of the vehicle, as shown in FIG. 1.

The cover 2 is of washable fabric and may be easily placed in position and taken off of the vehicle for folding and disposition in the trunk of the vehicle for future use. On the interior surface of at least side wall or panels 4 and 6 are disposed sensors 16. In this particular instance, the sensors 16 may be of the mercury switch type well-known in the art wherein in one position, i.e., the normal or vertically oriented position, electrical contact of the switch is not obtained. In switches of the mercury type, opposed poles will make an electrical connection upon a body or pool of mercury flowing in and about the poles to complete a circuit. The operation of mercury switches are well-known in the art and the specific operation and configuration thereof play no specific patentable aspect of the cover of the invention. Those of ordinary skill in the art will also recognize that sensors other than mercury switches may also be utilized in order to obtain the attributes of the herein disclosed invention.

The sensors 16 are releasably held to the interior surface of the side panels 4 and 6 by means of tape segments 18 and the switches 16 are connected via electrical wires 20 to an energy source and alarm system, as will become apparent. The electrical connectors or wires 20 are also held to the interior surface of panels 4 and 6 by means of tape segments 22. Thus, if it is desired to wash or otherwise clean the cover 2, removal of tape segments 18 and 22 will permit removal of the sensors 16 and associated electrical conduit or connectors 20.

In the specific embodiment illustrated, only two sensors are utilized, i.e., one on each of the side panels 4 and 6. The electrical connectors 20 may terminate in, for example, a male plug 30 for association with a female receptable 32, which forms part of an electrical system having an audible alarm 34 and an energy source 36 (FIG. 5).

Figure 5:
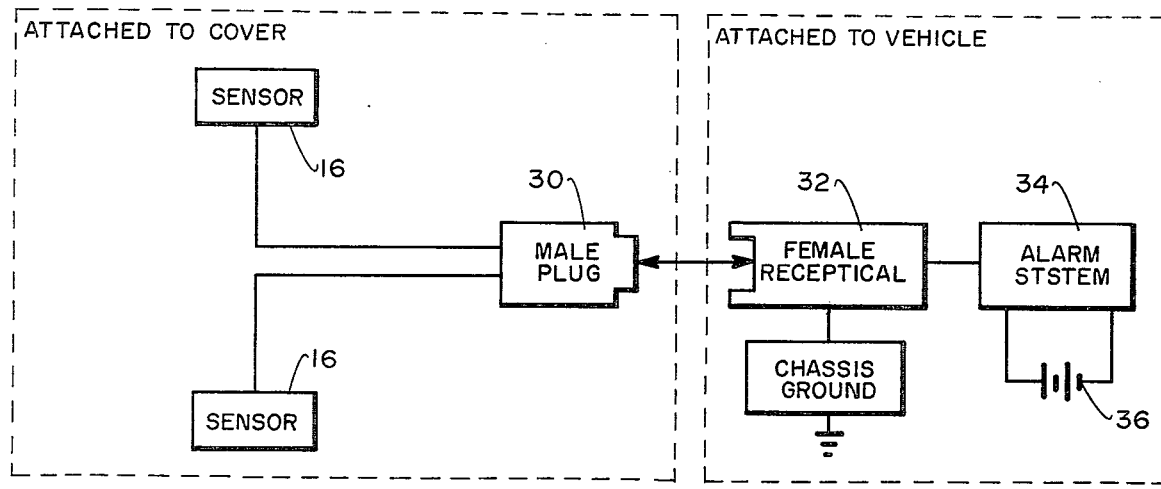
FIG. 5 schematically illustrates one type of electrical system for use with the cover of the invention.

In the FIG. 5 schematic illustration, the alarm system component may be individual, that is part of an overall automobile alarm device, or the battery and the horn of the vehicle to be protected may be utilized in lieu thereof in a manner well-known in the art.

Thus, in the cover 2 of the invention, it will be seen that this position of the cover, with secured sensors 16, in the relative position shown in FIG. 1, will upon coupling into the remainder of the system (see FIG. 5 for example) provide anti-tamper and anti-theft protection for the cover 2, the hubcaps (not shown) and wheels 14 of the vehicle, with which the cover 2 is utilized. Thus, if one would attempt to pick up the side panels 4 or 6, the movement thereof and more specifically, of the secured sensor from the vertically oriented position in the case where the sensor is a mercury switch, will cause energization of the circuitry to thereby sound the audible alarm, in this case, the automobile horn or the like. Likewise, any attempt to move the cover for unlawful entry into the vehicle will also sound the alarm. And, of course, attempt to take the cover will also cause the audible alarm to be sounded.

Thus, there has been disclosed a relatively inexpensive, easily maintained alarm system for use with automobile covers, which protects not only the cover but the vehicle, the vehicle wheels and vehicle hubcaps. The automobile cover alarm system may be used independently taking advantage of the energy source available in the automobile, and the audible alarm or horn of the automobile or alternately may be modularly connected to an already existing automobile alarm system to thereby give additional protection to the user thereof.

While there will be various modifications, alterations and changes which will suggest themselves to those of ordinary skill in the art, all such changes, alterations and modifications are intended to be covered by the appended claims.

While no specific details have been delved into for the alarm component of the invention, those of ordinary skill will at once recognize that various electrical systems will suffice for use with the cover of the invention. The alarm system may be of the fail safe-type or simply in series relationship with the cover sensors to complete the circuit when the sensors are moved or disturbed as set forth hereinbefore.

Additionally, while the invention has been specifically described with regard to the drawings, the sensors may be stitched in place within the cover. Also, the movement of the sensors may be utilized to complete a circuit which in turn triggers the transmission of an inaudible signal to a receiver, beeper or the like which would indicate tampering.

Also, various alternative circuitry modifications may be had. For example, provision may be made to complete the circuit and thereby produce a signal where the male plug is removed prior to turning off the alarm system. In this instance the female receptacle will close the circuit and thereby generate an alarm signal.

I claim:

1. An anti-tamper device for vehicles and the like comprising the combination: a conformable material cover having depending side panels to enshroud at least the major body portion of a vehicle; at least one sensor removably secured to each of said side panels and adapted to energize and de-energize an electrical circuit upon movement of said cover; electrical connector means connecting said sensors with an alarm system adapted to produce an alarm signal whereby in the normal covered state said sensors are in the non-energizing position and otherwise are in the energizing position to energize said alarm system to generate an alarm signal.

2. The device in accordance with claim 1 wherein said sensors are vertically oriented switches which in the normal position are in the non-energizing state and in the non-normal position are in the energizing or actuating state.

3. The device in accordance with claim 2 wherein said alarm system includes the vehicle horn as an audible alarm signal.

4. The device in accordance with claim 1 including a separate associated alarm system adapted to signal unauthorized movement of said vehicle.

5. The device in accordance with claim 1 wherein said side panels of said cover are at least long enough and depending to partially cover the wheels of said vehicle.

6. The device in accordance with claim 5 wherein said sensors and electrical connector means are releasably held in place on the interior surface of said side panels of said cover with adhesive-like tape.

7. The device in accordance with claim 6 wherein said cover is constructed of washable fabric.

8. The device in accordance with claim 7 wherein said sensors are mercury switches which upon movement a selected distance from vertical energizes said alarm system.

9. The device in accordance with claim 8 including an energy source to energize said alarm system.

10. The device in accordance with claim 9 including a vehicle battery and wherein said energy source in said vehicle battery and said sensors and electrical connector means are retained on the interior surface of said panels of said cover by means of adhesive tape.

11. The device in accordance with claim 10 which includes fail safe circuitry to energize the alarm circuit when said electrical connector means are disassociated from each other.

* * * * *